(12) United States Patent
Wang et al.

(10) Patent No.: US 8,415,582 B2
(45) Date of Patent: Apr. 9, 2013

(54) METHOD FOR MONITORING AND MAINTAINING A RESISTANCE WELDING APPARATUS

(75) Inventors: Pei-Chung Wang, Shanghai (CN); Samuel P. Marin, Oakland Township, MI (US); Sheila A. Marin, legal representative, Silver Spring, MD (US); Daniel C. Hutchinson, Goodrich, MI (US); Michael J. Karagoulis, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 326 days.

(21) Appl. No.: 12/842,145

(22) Filed: Jul. 23, 2010

(65) Prior Publication Data

US 2012/0018408 A1     Jan. 26, 2012

(51) Int. Cl.
*B23K 9/10* (2006.01)
(52) U.S. Cl. ............... 219/109; 219/110; 219/117.1; 219/91.23; 219/55; 219/107
(58) Field of Classification Search ............ 257/55, 257/69.16–69.17, 107, 121.23, 121.82, 121.83, 257/130.01, 124.02, 121.28, 121.32, 110, 257/109, 117.1, 91.2, 91.23, 118
See application file for complete search history.

(56) References Cited

U.S. PATENT DOCUMENTS

| 4,734,555 A | 3/1988 | Ferguson |
| 4,999,475 A | 3/1991 | Yasuge |
| 2005/0045597 A1* | 3/2005 | Wang et al. ............ 219/110 |
| 2008/0237303 A1* | 10/2008 | Lin et al. ............ 228/103 |

FOREIGN PATENT DOCUMENTS

DE        19854956 C2    12/2000

\* cited by examiner

*Primary Examiner* — Steven Loke
*Assistant Examiner* — Cuong Nguyen
(74) *Attorney, Agent, or Firm* — Quinn Law Group, PLLC

(57) ABSTRACT

A method of monitoring and maintaining a weld cap which is executing successive resistance welds on a plurality of workpieces includes measuring a first weld indentation formed during a first resistance weld and measuring a second weld indentation formed during a second resistance weld. The measured first and second weld indentations are compared with a severe threshold. If either of the measured first or second weld indentations is greater than the severe threshold, an abnormal condition is signaled. The method may include tip dressing the weld cap based upon the signaled abnormal condition. The method may further include determining a degradation rate between the first resistance weld and the second resistance weld. The degradation rate is the time differential between the measured first and second weld indentations, and either a first or a second tip dressing schedule is chosen based upon the determined degradation rate.

7 Claims, 2 Drawing Sheets

METHOD FOR MONITORING AND MAINTAINING A RESISTANCE WELDING APPARATUS

TECHNICAL FIELD

This disclosure relates to methods for monitoring and maintaining resistance welding apparatus and, more specifically, to weld caps for resistance welding apparatuses.

BACKGROUND

Resistance welding or electric resistance welding is a welding process, such as spot and seam welding, in which heat to form the weld is generated by the resistance of the welding current through the workpieces. Spot resistance welding may be used to join two or more overlapping metal workpieces, such as metal sheets. Electrodes are simultaneously used to clamp the workpieces together and to pass current through the workpieces. When the current is passed between the electrodes, heat is generated due to the higher electrical resistance where the surfaces of the workpieces contact each other. The electrodes, or the ends of the electrodes, are usually formed from conductive materials, such as copper or copper alloys.

SUMMARY

A method of monitoring and maintaining a weld cap which is executing successive resistance welds on a plurality of workpieces is provided. The method includes measuring a first weld indentation formed during a first resistance weld and measuring a second weld indentation formed during a second resistance weld. The measured first and second weld indentations are compared with a severe threshold. If either of the measured first or second weld indentations is greater than the severe threshold, an abnormal condition is signaled. The method may include tip dressing the weld cap based upon the signaled abnormal condition.

The method may further include recording a time lapse between the first resistance weld and the second resistance weld, and determining a degradation rate between the first resistance weld and the second resistance weld. The degradation rate is the time differential of the measured first weld indentation and the measured second weld indentation. If the abnormal condition is signaled, one of a first tip dressing schedule and a second tip dressing schedule is chosen based upon the determined degradation rate.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
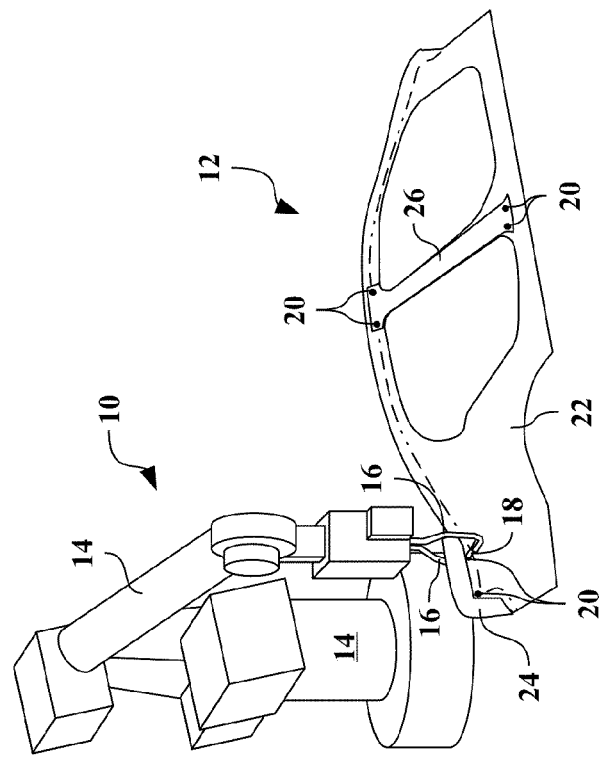
FIG. 1 is a schematic isometric view of a resistance welding apparatus and assembly.

Referring to the drawings, wherein like reference numbers correspond to like or similar components throughout the several figures, there is shown in FIG. 1 a highly-schematic view of a resistance welding apparatus 10 executing a resistance welding process on an assembly 12. A welding robot 14 articulates and supports two electrode arms 16, both of which include a weld cap 18 on one end. The welding apparatus 10 passes electric current through the electrode arms 16.

In FIG. 1, the weld caps 18 are shown executing a plurality of resistance welds 20 on the assembly 12. The assembly 12 is being formed from a plurality of workpieces, including a first workpiece 22, a second workpiece 24, and a third workpiece 26. The assembly 12 shown may be a portion of vehicle body or unibody by attaching reinforcement members or elements. The first workpiece 22, second workpiece 24, and third workpiece 26 may be formed from the same or differing materials capable of being welded to each other, including numerous metals.

The resistance welds 20 for the assembly 12 may be made by the same welding robot 14, by a group of welding robots 14, by hand-actuated electrode arms 16, or any combination thereof. In each case, the electrode arms 16 and the weld caps 18 may be executing successive resistance welds 20 on the same assembly 12 or on successive assemblies 12, such as those moving through an assembly line, or some combination of both.

While the present invention may be described and illustrated with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

Figure 2:
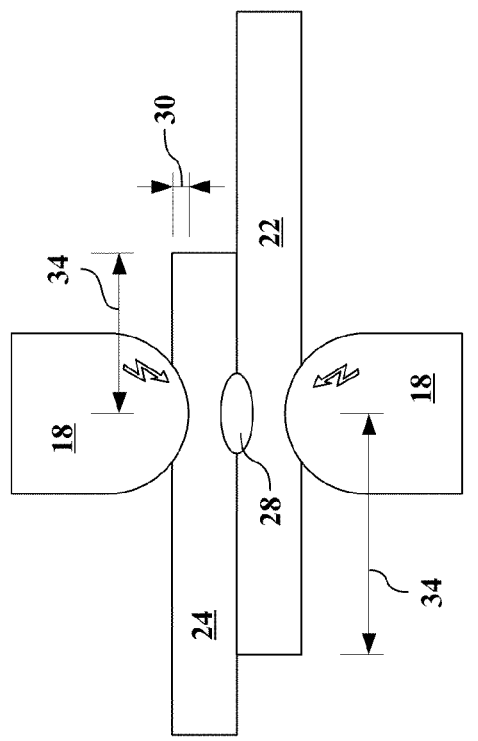
FIG. 2 is a schematic diagram of two workpieces during a resistance spot welding process.

Referring now to FIG. 2, and with continued reference to FIG. 1, there is shown highly-schematic diagram of an illustrative resistance spot welding process, such as those used to form the resistance welds 20 shown in FIG. 1. The weld caps 18 are located on opposing sides of the first workpiece 22 and the second workpiece 24. The weld caps 18 may have rounded tips (as shown in FIG. 2) or may have flattened or truncated tips making contact with the first workpiece 22 and the second workpiece 24.

As current is passed between the weld caps 18, the electrode arms 16 (not shown in FIG. 2) apply pressure to the weld caps 18. The current flowing between the weld caps 18 heats the first workpiece 22 and the second workpiece 24, causing the metal to melt and form a fusion region 28 at the interface of the first workpiece 22 with the second workpiece 24. The fusion region 28 permanently joins or attaches the first workpiece 22 to the second workpiece 24.

The heat and pressure on the weld caps 18 causes the weld caps 18 to advance into the first workpiece 22 and the second workpiece 24, forming weld indentations 30. The size of weld indentions 30 is measured as the distance from the tip of the weld cap 18 to the surface of the workpiece into which the weld cap 18 is advancing. In addition to the pressure applied by the electrode arms 16, the amount of liquefied metal in the fusion region 28 during welding may affect the size of the weld indentations 30. Components within the welding robot 14 measure the size of the weld indentations 30 formed during each resistance weld 20.

The resistance weld 20 may be made near an edge of either the first workpiece 22 or the second workpiece 24. An overlap distance 34 is the distance from the center of the weld cap 18 to the nearest edge of the first workpiece 22 or the second workpiece 24 into which the weld cap 18 is advancing.

Figure 3:
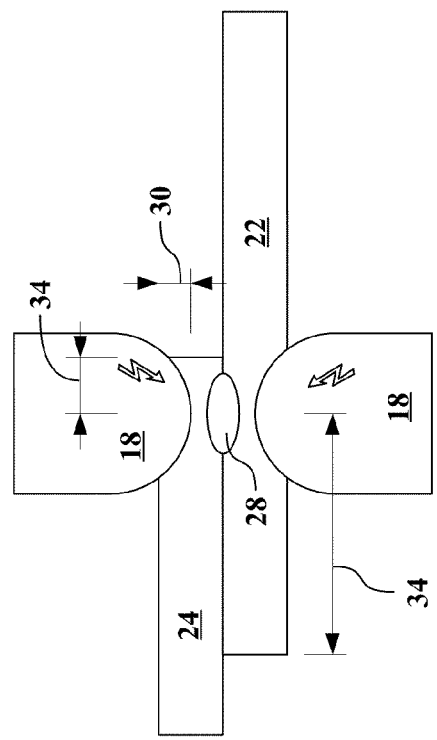
FIG. 3 is a schematic diagram of two workpieces during a resistance spot welding process in which an edge weld is occurring.

Referring now to FIG. 3, and with continued reference to FIGS. 1-2, there is shown another highly-schematic diagram of an illustrative resistance spot welding process, such as those used to form the resistance welds 20 shown in FIG. 1. However, the resistance weld 20 illustrated in FIG. 3 may be referred to as an edge weld. The weld caps 18 are again located on opposing sides of the first workpiece 22 and the second workpiece 24.

As current is passed between the weld caps 18, the electrode arms 16 (not shown in FIG. 2) apply pressure to the weld caps 18. The current flowing between the weld caps 18 heats the first workpiece 22 and the second workpiece 24, causing the metal to melt and form the fusion region 28 at the interface of the first workpiece 22 with the second workpiece 24. The fusion region 28 permanently joins or attaches the first workpiece 22 to the second workpiece 24.

The overlap distance 34 of the second workpiece 24 shown in FIG. 3 is smaller than the overlap distance 34 of the second workpiece 24 shown in FIG. 2. The overlap distance 34 is small enough that a portion of the weld cap 18 is overhanging the edge of the second workpiece 24.

The edge weld shown in FIG. 3 may result in damage to one or both of the weld caps 18. For example, and without limitation, the variable pressure distribution across the tip of the weld cap 18 advancing into the second workpiece 24 may cause a ridge or other abnormality to form on the tip of the weld cap 18 impacting the edge of the second workpiece 24. The high current density at the edge of the weld cap 18 (or the second workpiece 24) results in generation of intensive heat and may consequently cause degradation of the weld cap 18. Additionally, the alteration in current flow caused by the edge weld may lead to a large amount of liquefied metal during the resistance weld 20. The liquefied metal may come into contact with one or more of the weld caps 18, causing damage thereto.

As shown in FIG. 3, the edge weld causes the weld caps 18 to plunge further into the first workpiece 22 and the second workpiece 24, increasing the size of the weld indentations 30 measured by the welding apparatus 10 during the edge weld. Furthermore, subsequent resistance welds 20 executed by the now-damaged weld caps 18 may also have uneven current density between the weld cap 18 and first or second workpiece 22, 24 and consequently accelerate the degradation of the weld cap 18. Once the weld cap 18 is damaged, the current density is concentrated at the damaged locations. As a result, subsequent weld indentations 30 (or weld sizes) decrease when compared to resistance welds 20 occurring prior to the edge weld.

Depending upon the magnitude of the decrease in the size of the weld indentations 30, the welding apparatus 10 may be able to determine that an edge weld has occurred by monitoring and processing the size of weld indentations 30 occurring during successive resistance welds 20. The damage may be detected from the increased indentation size during the edge weld, or from the decreased indentation size on welds subsequent to the edge weld. Damaged weld caps 18 may be repaired, serviced, or replaced by tip dressing based upon a tip dressing schedule.

Tip dressing may include polishing or grinding the weld cap 18 to its original or preferred shape and state, such as by using a blade to remove chips or ridges from the weld cap 18. The tip dressing schedule may vary the aggressiveness (angle and pressure of the blade or grinding device) and the duration of the tip dressing process. Furthermore, if the tip dressing process is fully-automated, the welding apparatus 10 may carry out the required tip dressing on its own.

Figure 4:
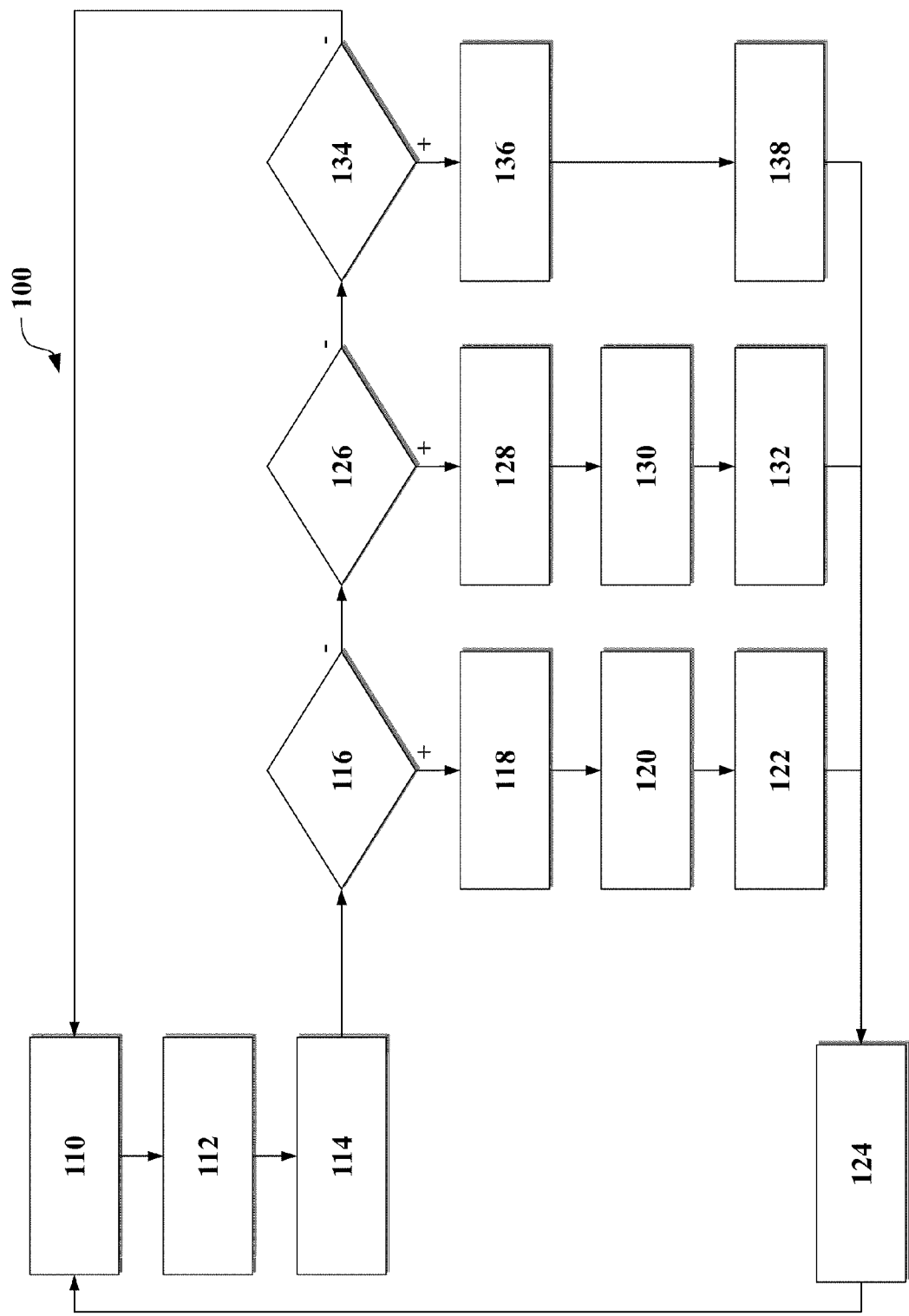
FIG. 4 is a schematic flow chart of an algorithm or method for monitoring and maintaining a weld cap executing resistance welds.

Referring now to FIG. 4, and with continued reference to FIGS. 1-3, there is shown a schematic flow chart of an algorithm or method 100 for monitoring and maintaining a weld cap (such as the weld caps 18) executing resistance welds (such as the resistance welds 20). While much of the method 100 is illustrated and described with respect to the structure shown in FIGS. 1-3, other components and setups may be used within the scope of the method.

Step 110: Execute Resistance Weld. The welding apparatus 10 executes one of a succession of resistance welds 20, which may be referred to as a first resistance weld 20, a second resistance weld 20, et cetera. The method 100 may be used for a fixed cycle of resistance welds 20, for a fixed cycle of workpiece assemblies (such as the assembly 12), for a fixed time period, or for any combination thereof. The method 100 is illustrated as iterative and continuously looping, but may have a fixed number of cycles or may be started and stopped after any number of loops.

Step 112: Measure Weld Indentation (I). During or subsequent to executing the first resistance weld 20, the method 100 measures a first weld indentation 30 formed during the first resistance weld 20. The method 100 also measures a second weld indentation 30 formed during the second resistance weld 20. As the method 100 executes successive resistance weld 20, it is also recording a time lapse between the first resistance weld 20 and the second resistance weld 20, and each subsequent resistance weld 20.

Step 114: Calculate Degradation Rate (dI/dt). The method 100 determines a degradation rate between the first resistance weld 20 and the second resistance weld 20. The degradation rate is the time differential of the measured first weld indentation 30 and the measured second weld indentation 30. The degradation rate will change as successive resistance welds 20 are executed and successive weld indentations 30 are measured. The degradation rate may be an instantaneous differential or may be a running average.

Step 116: Determine whether the Measured Weld Indentation (I) is Greater Than a Severe Threshold. The method compares the measured first weld indentation 30 or the measured second weld indentation 30 with a severe threshold. The severe threshold is determined by executing and analyzing a plurality of edge welds (such as the edge weld shown in FIG. 3).

Each edge weld occurs when the weld cap 18 executes the resistance weld 20 at less than a minimum overlap distance 34 from an edge of one of the plurality of workpieces. The minimum overlap distance 34 is determined from testing of known edge welds, and is the distance below which adverse effects on the weld cap 18 begin to occur. The edge-weld indentations (which are weld indentations 30 resulting from known edge welds) created during each of the executed plurality of edge welds are measured. The measured edge-weld indentations are then analyzed and the severe threshold is set or calculated based upon the analysis of the edge-weld indentations.

Step 118: Signal Abnormal Condition. If the measured first weld indentation 30 or the measured second weld indentation 30 is greater than the severe threshold, method 100 includes signaling an abnormal condition, as shown at step 118. The abnormal condition may be signaled to an operator or controller responsible for the assembly 12 or the welding apparatus 10, to a computerized controller tracking the assembly 12 or the welding apparatus 10, to a computer readable storage medium, or another suitable receiver of the signal.

As viewed in FIG. 4, decision steps answered positively (as a yes) follow the path labeled with a "+" sign (the mathematical plus or addition operator). Similarly, decision steps answered negatively (as a no) follow the path labeled with a "−" sign (the mathematical minus or subtraction operator).

Step 120: Determine Cap Abnormality from the Degradation Rate (dI/dt). The method 100 may use the degradation rate and, possibly, the measured weld indentation 30 (which has been determined to be abnormal) to determine the type and extent of the abnormality. For example, at step 120 the method 100 may compare the degradation rate to known situations in which the weld cap 18 has been deformed along the edge of the first workpiece 22 and a large ridge has formed on the tip of the weld cap 18. Furthermore, the method 100 may compare the degradation rate to known situations in which the weld cap 18 has been directly subjected to liquefied metal from the fusion region 28.

Step 122: Abnormality-Based Dressing Schedule. If the abnormal condition is signaled, the method 100 may choose one of a first tip dressing schedule and a second tip dressing schedule based upon the determined degradation rate. The first and second tip dressing schedules may coincide with the different types of abnormalities determined in step 120.

Step 124: Tip Dressing Process or Processes. The method 100 then tip dresses the abnormal (damaged) weld cap 18 based upon the signaled abnormal condition. If the type and magnitude of the abnormality were determined in step 120 and a specific tip dressing schedule chosen in step 122, step 124 may implement that tip dressing schedule. However, tip dressing at step 124 may include mechanical or visual inspection and determination of a tip dressing schedule based upon the inspection. Furthermore, if the tip dressing process is fully-automated, the welding apparatus 10 may carry out the required tip dressing on its own.

Following step 124, the method 100 returns to step 110 to execute another resistance weld 20. Alternatively, the method 100 may proceed from step 122 directly to step 110 until the operating cycle is finished. For example, the method 100 may be configured to complete any remaining resistance welds 20 for the assembly 12 before stopping the welding apparatus 10 to undergo tip dressing at step 124.

Step 126: Determine Whether the Measured Weld Indentation (I) is Less Than a Wear Threshold. If step 116 determines that neither the first weld indentation 30 nor the second weld indentation 30 is greater than the severe threshold, the method 100 proceeds to step 126. The method 100 then compares the measured first weld indentation 30 and the measured second weld indentation 30 with a wearing threshold.

Similar to the severe threshold, the wearing threshold may be determined by experimentation or analysis. As the weld caps 18 are used to make additional successive resistance welds 20, the weld caps 18 may eventually degrade. For example, and without limitation, the tip of the weld caps 18 may become enlarged—or begin to mushroom outward—due to the pressure applied by the electrode arms 16. As the tips of the weld caps 18 increase in size, the current density flowing between the weld caps 18 is decreased because the current is distributed over a larger area. The lower current density may result in smaller (less-deep) weld indentations 30.

Step 128: Signal Wear Condition. If one of the measured first weld indentation 30 and the measured second weld indentation 30 is less than the wearing threshold, the method 100 signals an excessive-wear condition at step 128. The wear condition may also be signaled to an operator or controller responsible for the assembly 12 or the welding apparatus 10, to a computerized controller tracking the assembly 12 or the welding apparatus 10, to a computer readable storage medium, or another suitable receiver of the signal.

Step 130: Determine Wear Level from the Degradation Rate (dI/dt). The method 100 may use the degradation rate and, possibly, the measured weld indentation 30 to determine the type and extent of the wear on the weld caps 18. For example, at step 120 the method 100 may compare the degradation rate to known situations in which the weld cap 18 has been mushroomed due to excessive pressure or extended use.

Step 132: Wear-Based Dressing Schedule. If the wear condition is signaled, the method 100 may choose one of a third tip dressing schedule and a fourth tip dressing schedule based upon the determined degradation rate. The third and fourth tip dressing schedules may coincide with the different levels of wearing on the weld caps 18 determined in step 130. Depending upon the severity of the wear condition, the method may either proceed to step 124 for tip dressing or may return to step 110 to continue executing resistance welds 20 until the end of the cycle or until completion of the assembly 12. Furthermore, step 132 may determine that subsequent resistance welds 20 should be executed with increased current passing through the weld caps 18 to increase the current density, which may (at least temporarily) overcome the wear condition.

Step 134: Determine Whether the Number of Welds is Greater Than a Nominal Value. If step 126 determines that neither the first weld indentation 30 nor the second weld indentation 30 is less than the wear threshold, the method proceeds to step 134. The method 100 then compares the total number of resistance welds 20 executed to a nominal value. A predetermined nominal schedule for tip dressing the weld cap 18 is based upon the expected wear and tear of weld caps 18 during normal or nominal operation. If the number of welds executed by the welding apparatus 10 is not greater than the nominal value, the method 100 returns to step 110 to continue executing resistance welds 20.

Step 136: Signal End of Nominal Life. If the number of welds executed by the welding apparatus 10 is greater than the nominal value, the end of the nominal life is signaled. Like the other signals, this signal may be sent to myriad receivers. Furthermore, if the tip dressing process is fully-automated, the signal may stay within the welding apparatus 10, which then may carry out the required tip dressing on its own.

Step 138: Select Nominal Dressing Schedule. If the nominal end is signaled, the method 100 will choose a nominal tip dressing schedule. The nominal tip dressing schedule may be determined from analysis of prior nominal wear rates of weld caps 18. The method 100 then proceeds to step 124 and tip dresses the weld cap 18 based upon the nominal schedule.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of monitoring and maintaining a weld cap which is executing successive resistance welds on a plurality of workpieces, the method comprising:
measuring a first weld indentation formed during a first resistance weld;
comparing the measured first weld indentation with a severe threshold;
when the measured first weld indentation is greater than the severe threshold, signaling an abnormal condition;

tip dressing the weld cap based upon the signaled abnormal condition;

measuring a second weld indentation formed during a second resistance weld;

comparing the measured second weld indentation with the severe threshold;

when the measured second weld indentation is greater than the severe threshold, signaling the abnormal condition;

recording a time lapse between the first resistance weld and the second resistance weld;

determining a degradation rate between the first resistance weld and the second resistance weld, wherein the degradation rate is the time differential of the measured first weld indentation and the measured second weld indentation; and when the abnormal condition is signaled, choosing one of a first tip dressing schedule and a second tip dressing schedule based upon the determined degradation rate.

2. The method of claim 1, wherein the severe threshold is determined by:

executing a plurality of edge welds, wherein each edge weld occurs when the weld cap executes the resistance weld at less than a minimum overlap distance from an edge of one of the plurality of workpieces;

measuring an edge-weld indentation during each of the executed plurality of edge welds;

analyzing the measured edge-weld indentations; and setting the severe threshold based upon the analysis of the edge-weld indentations.

3. The method of claim 2, further comprising:

comparing the measured first weld indentation and the measured second weld indentation with a wearing threshold; and when one of the measured first weld indentation and the measured second weld indentation is less than the wearing threshold, signaling an excessive-wear condition.

4. The method of claim 3, further comprising:

when the excessive wear condition is signaled, choosing one of a third tip dressing schedule and a fourth tip dressing schedule based upon the determined degradation rate.

5. The method of claim 4, further comprising:

predetermining a nominal schedule for tip dressing the weld cap; and when no abnormal condition is signaled and no excessive-wear condition is signaled, tip dressing the weld cap based upon the nominal schedule.

6. A method of monitoring and maintaining a weld cap which is executing successive resistance welds on a plurality of workpieces, the method comprising:

measuring a first weld indentation formed during a first resistance weld;

measuring a second weld indentation formed during a second resistance weld;

comparing the measured first weld indentation with a severe threshold;

comparing the measured second weld indentation with the severe threshold;

when one of the measured first weld indentation and the measured second weld indentation is greater than the severe threshold, signaling an abnormal condition;

tip dressing the weld cap based upon the signaled abnormal condition;

recording a time lapse between the first resistance weld and the second resistance weld;

determining a degradation rate between the first resistance weld and the second resistance weld, wherein the degradation rate is the time differential of the measured first weld indentation and the measured second weld indentation; and when the abnormal condition is signaled, choosing one of a first tip dressing schedule and a second tip dressing schedule based upon the determined degradation rate.

7. The method of claim 6, wherein the severe threshold is determined by:

executing a plurality of edge welds, wherein each edge weld occurs when the weld cap executes the resistance weld at less than a minimum overlap distance from an edge of one of the plurality of workpieces;

measuring an edge-weld indentation during each of the executed plurality of edge welds;

analyzing the measured edge-weld indentations; and setting the severe threshold based upon the analysis of the edge-weld indentations.

* * * * *